Figure 1:
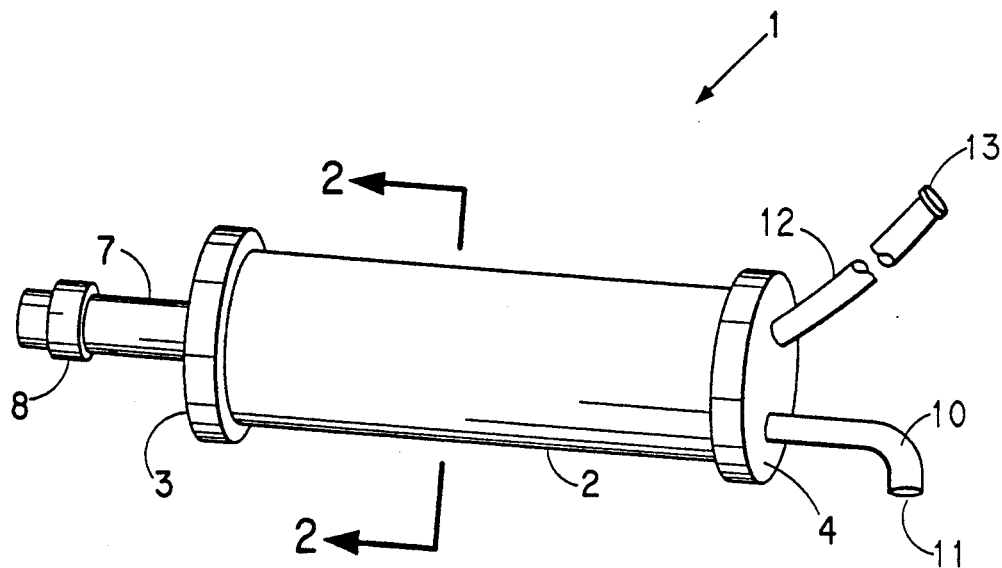

United States Patent [19]

Nemser

[11] Patent Number: 5,051,113
[45] Date of Patent: Sep. 24, 1991

[54] AIR-INTAKE SYSTEM FOR MOBILE ENGINES

[75] Inventor: Stuart M. Nemser, Wilmington, Del.

[73] Assignee: Du Pont Canada Inc., Mississauga, Canada

[21] Appl. No.: 538,058

[22] Filed: Jun. 13, 1990

[51] Int. Cl.5 .................... B01D 53/22; B01D 71/32
[52] U.S. Cl. .................................... 55/16; 55/68; 55/158; 123/26
[58] Field of Search ................. 55/16, 68, 158; 123/25 A, 26

[56] References Cited

U.S. PATENT DOCUMENTS

| | | | |
|---|---|---|---|
| 3,308,107 | 3/1967 | Selman et al. | 55/16 X |
| 4,174,955 | 11/1979 | Blackmer et al. | 55/16 X |
| 4,530,569 | 7/1985 | Squire | 526/247 X |
| 4,553,988 | 11/1985 | Shimizu et al. | 55/158 |
| 4,565,855 | 1/1986 | Anderson et al. | 526/247 |
| 4,754,009 | 6/1988 | Squire | 526/247 |
| 4,883,023 | 11/1989 | Tsang et al. | 55/158 X |
| 4,950,315 | 8/1990 | Gollan | 55/158 |

FOREIGN PATENT DOCUMENTS

| | | | |
|---|---|---|---|
| 0024718 | 3/1981 | European Pat. Off. | 55/16 |
| 0108426 | 5/1984 | European Pat. Off. | 55/158 |
| 56-166903 | 12/1981 | Japan | 55/158 |
| 59-212632 | 12/1984 | Japan | 55/158 |
| 60-102901 | 6/1985 | Japan | 55/158 |
| 61-078419 | 4/1986 | Japan | 55/158 |
| 61-146320 | 7/1986 | Japan | 55/158 |
| 61-149225 | 7/1986 | Japan | 55/158 |
| 61-157325 | 7/1986 | Japan | 55/158 |
| 62-169923 | 7/1987 | Japan | 55/16 |
| 62-183837 | 8/1987 | Japan | 55/158 |
| 63-156514 | 6/1988 | Japan | 55/158 |
| 1-63021 | 3/1989 | Japan | 55/158 |
| 0345717 | 6/1979 | U.S.S.R. | 55/16 |
| 2122103A | 1/1984 | United Kingdom . | |

Primary Examiner—Robert Spitzer
Attorney, Agent, or Firm—Craig H. Evans

[57] ABSTRACT

An air intake system for a mobile combustion engine is disclosed. The air intake system comprises a membrane formed from an amorphous polymer of perfluoro-2,2-dimethyl-1,3-dioxole, the membrane exhibitign an oxygen/nitrogen selectivity of at least 1.4:1. The permeate section of the membrane is adapted to be in fluid flow communication with a combustion zone of the mobile combustion engine. The membrane preferably has an oxygen flux in excess of 100 Barrers, esepcially in excess of 500 Barrers. The air intake system provides oxygen-enriched air for the engine, to make the engine more efficient.

21 Claims, 1 Drawing Sheet

AIR-INTAKE SYSTEM FOR MOBILE ENGINES

The present invention relates to an air intake system for mobile engines, especially an air intake system for automotive engines, and in particular to an air intake system that has a selectively permeable membrane to effect oxygen enrichment of the air entering into the intake.

Methods for the enrichment of and/or separation of gaseous admixtures, including gaseous admixtures of oxygen and nitrogen e.g. air, are known. In particular, a membrane formed from a polymer of a perfluorodioxole is described in the U.S. patent application of S. M. Nemser and I. D. Roman, USSN 07/366 400, filed June 15, 1989, and the related continuation-in-part patent application filed concurrently herewith. These applications describe a selectively permeable membrane, for the separation of a wide variety of gaseous admixtures, formed from an amorphous polymer of perfluoro-2,2-dimethyl-1,3-dioxole. The membrane may be a supported membrane, in the form of a film or a coating on a porous support or in the form of a hollow fibre. The membrane may be used for the separation of gaseous admixtures of organic compounds e.g. gaseous fluorocarbons or volatile organic compounds, from other gases. In addition, the membranes may be used for the separation of a wide variety of gaseous mixtures, including oxygen from nitrogen i.e. to enrich air in the amount of oxygen contained therein.

The use of membrane oxygen enrichment in natural gas combustion is described by S. G. Kimura and W. R. Browall in Journal of Membrane Science, 29(1986)69–77. The article states that combustion with oxygen enriched air can substantially reduce fuel consumption in certain applications and the use of a membrane is a potentially attractive approach for producing oxygen enriched air. A silicone based oxygen enrichment membrane was fabricated and tested, giving a reduction in natural gas consumption.

Apparatus for increasing or decreasing the oxygen fraction of air to be conveyed to a consumer is disclosed by F. Wolff in published European patent application 0,024,718, published 1981 Mar. 11,. Apparatus for purifying the air contained in a confined space e.g. the passenger cabin of an automobile, is disclosed in published UK patent application 2,122,103 of M. Yamamoto et al, published Jan. 11, 1984.

An automotive air intake system for a mobile combustion engine has now been found, the system being formed from a membrane comprised of an amorphous polymer of perfluoro-2,2-dimethyl-1,3-dioxole.

Accordingly, the present invention provides an air intake system for a mobile combustion engine, said air intake system comprising a membrane formed from an amorphous polymer of perfluoro-2,2-dimethyl-1,3-dioxole, said membrane exhibiting an oxygen/nitrogen selectivity of at least 1.4:1.

In a preferred embodiment of the air intake system, the membrane has an air feed section and a permeate section, said permeate section being adapted to be in fluid flow communication with a combustion zone of the mobile combustion engine.

The present invention also provides a mobile combustion engine having a combustion zone, and an air intake system for the combustion zone, in which the air intake system comprises an oxygen enrichment membrane formed from an amorphous polymer of perfluoro-2,2-dimethyl-1,3-dioxole, said membrane exhibiting an oxygen/nitrogen selectivity of at least 1.4:1, said membrane having an air feed section and a permeate section with the permeate section being in fluid flow communication with the combustion zone.

The present invention further provides a process for the operation of a mobile combustion engine having a combustion zone, and an air intake system for the combustion zone, in which the air intake system comprises an oxygen enrichment membrane formed from an amorphous polymer of perfluoro-2-2-dimethyl-1,3-dioxole, said membrane exhibiting an oxygen/nitrogen selectivity of at least 1.4:1, said membrane having an air feed section and a permeate section, comprising feeding air to the feed section of the membrane and feeding oxygen enriched air from the permeate section to the combustion zone of the mobile combustion engine, said permeate section preferably operating under vacuum.

In embodiments of the present invention, the membrane has a flux in excess of 100 Barrers.

In a further embodiment of the present invention, the membrane is in the form of a plurality of hollow fibres, especially hollow fibres in which the air intake system is connected to the interior of the fibres.

Figure 2:
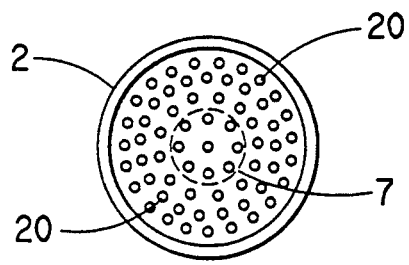

The present invention is illustrated by the embodiments shown in the drawings in which:

FIG. 1 is a schematic representation of an air intake system of the invention; and FIG. 2 is a schematic representation of a cross-section of the air intake system of FIG. 1, through A—A.

An embodiment of the air intake system of the invention is shown in FIG. 1, being generally referred to by 1. Air intake system 1 is comprised of a cylinder 2 having end caps 3 and 4. End cap 3 is on the inlet end of cylinder 2, and end cap 4 is on the outlet end of cylinder 2. Cylinder 2 is filled with a plurality of hollow fibres (not shown).

End cap 3 is also fitted with air inlet pipe 7 that has a filter 8 in-line with air inlet pipe 7; filter 8 may be conveniently in the form of a filter and a valve for control of flow of air entering into air inlet pipe 7. Air inlet pipe 7 may be fitted with pump means in order to facilitate flow of air into the inlet pipe.

End cap 4 has a first outlet pipe 10 having an exhaust outlet 11. End cap 4 is also fitted with second outlet pipe 12 that is fitted with a connector 13. Connector 13 is intended to be attached to means for fluid flow communication with the combustion zone of the mobile combustion engine (not shown).

Inlet pipe 7 may be connected to and in fluid flow communication with the interior of the hollow fibres located inside cylinder 2. In that event, first outlet pipe 10 is also connected to and in fluid flow communication with the interior of the hollow fibres, and second outlet pipe 12 is connected to and in fluid flow communication with the exterior of the fibres. Alternatively, inlet pipe 7 is connected to and in fluid flow communication with the exterior of the hollow fibres located inside cylinder 2, and the outlet pipes would be connected in the opposite manner to that described above. Thus, the air intake system 1 shown in FIG. 1 may have inlet pipe 7 in fluid flow communication either with the interior or passed the exterior of the hollow fibres, with the outlet pipes connected accordingly.

FIG. 2 shows a cross-section of cylinder 2, with a plurality of hollow fibres 20, also shown in cross-section. Inlet pipe 7 is also shown.

In FIGS. 1 and 2, the membrane has been referred to as being a hollow fibre. Although this is believed to be the preferred configuration of the membrane, other shapes may be used e.g. membranes in the form of films or coatings, including in the form of spiral cartridges. The membranes must be thin, in order to maximize the rate of gas transmission through the membrane, preferably less than 0.01 mm and especially less than 0.001 mm in thickness; in the case of composite membranes, such thickness refers to the thickness of the layer or coating of the amorphous polymer.

In operation, air is fed in through air inlet pipe 7, passes either through or over the exterior of the hollow fibres 20 i.e to the feed side of the membrane, depending on the method of connection of inlet pipe 7, and exits through first outlet 10. Oxygen preferentially passes through the membrane i.e. the hollow fibres, such that the air on the permeate side is enriched in oxygen. The permeate side of the hollow fibre membrane will usually be operated under a partial vacuum e.g. it will be connected to the combustion zone of the mobile combustion engine. The permeate zone may be the sole source of oxygen for the combustion zone, but it may be preferable to have a supplementary source of oxygen e.g. air, that is also in fluid flow communication with the combustion zone. Appropriate valving means may be used to control the addition of supplementary amounts of air, especially based on the instantaneous demand of the combustion engine for oxygen.

FIG. 1 shows the inlet air and outlet enriched air being in a co-current relationship. It is to be understood, however, that the inlet air and outlet enriched air may also be in a counter-current relationship with the outlet for the enriched air i.e. second outlet pipe 12, being on the same end of cylinder 2 as inlet pipe 7. Second outlet pipe 12 may also be located between end cap 3 and end cap 4.

The selectively permeable membrane is formed form an amorphous polymer of perfluoro-2,2-dimethyl-1,3-dioxole. In embodiments, the polymer is a homopolymer of perfluoro-2,2-dimethyl-1,3-dioxole. In other embodiments, the polymer is a copolymer of perfluoro-2,2-dimethyl-1,3-dioxole, including copolymers having a complementary amount of at least one monomer selected from the group consisting of tetrafluoroethylene, perfluoromethyl vinyl ether, vinylidene fluoride and chlorotrifluoroethylene. In one preferred embodiment, the polymer is a dipolymer of perfluoro-2,2-dimethyl-1,3-dioxole and a complementary amount of tetrafluoroethylene, especially such a polymer containing 65-99 mole % of perfluoro-2,2-dimethyl-1,3- dioxole. The amorphous polymer preferably has a glass transition temperature of at least 140°C., and more preferably at least 180°C. Glass transition temperature ($T_g$) is known in the art and is the temperature at which the polymer changes from a brittle, vitreous or glassy state to a rubbery or plastic state. Examples of dipolymers are described in further detail in the aforementioned U.S. Pat. No. 4,754,009 of E. N. Squire.

The glass transition temperature of the amorphous polymer will vary with the actual polymer of the membrane, especially the amount of tetrafluoroethylene or other comonomer that may be present. Examples of $T_g$ are shown in FIG. 1 of the forementioned U.S. Pat. No. 4,754,009 of E. N. Squire as ranging from about 260°C. for dipolymers with tetrafluoroethylene having low amounts of tetrafluoroethylene comonomer down to less than 100°C. for the dipolymers containing at least 60 mole % of tetrafluoroethylene.

The membranes of the present invention may be manufactured by a variety of methods known to those skilled in the art, particularly in the light of the versatile processability of the perfluorodioxole polymers. These methods include solvent and melt film-casting and fibre-casting methods, as well as coating techniques.

The gaseous admixture fed to the air intake system will normally be in the form of air, especially ambient air. The membranes used in the air intake system of the present invention are capable of being used at elevated temperature, including in some embodiments at temperatures above 100°C. The air intake systems may be operated at such elevated temperature especially temperatures of up to 90°C. and in particular up to 50°C. Such temperatures may be achieved, for example, by heat exchange of inlet air with exhaust gases from the combustion engine. However, the membranes should be used at a temperature below the glass transition temperature, and especially at least 30°C. below the glass transition temperature, of the amorphous polymer used to form the membrane; these capabilities are beyond the normal operating requirements for automotive end-uses. In preferred embodiments, the glass transition temperature is at least 140°C. and especially at least 180°C. The method of the present invention may be operated at relatively low temperatures e.g. below 0°C.

The gas admixture may originate from a wide variety of sources. For example, the gaseous admixture may be air, or an admixture derived from air e.g. an admixture that has been enriched in oxygen using for example the method of the present invention.

As exemplified hereinafter, oxygen and nitrogen tend to preferentially pass through the selectively permeable membranes, with oxygen being passed in preference to nitrogen, and does so at high flux. In preferred embodiments of the present invention, the membrane has a permeability to oxygen of at least 100 Barrers, especially at least 200 Barrers and preferably at least 500 Barrers. Preferably, the membrane has a selectivity of oxygen over nitrogen of at least 1.7:1.

The perfluorodioxoles membranes described herein with respect to the present invention are expected to be outstanding membrane materials for air intake systems for mobile combustion engines. In preferred embodiments of the air intake systems using the membranes described herein, the air intake system (excluding pipes or other means of fluid flow communication to the combustion zone) preferably occupies less than 56,000 cm$^3$, especially less than 28,000 cm$^3$ and more preferably less than 14,000 cm$^3$. In addition, the surface area of the membrane is preferably less than 460 m$^2$ and more preferably less than 230 m$^2$; in embodiments the surface area is less than 140 m$^2$ and especially less than 90 m$^2$.

In embodiments, the air intake system of the present invention will provide oxygen-enriched air containing 23-35% of oxygen, especially 23-27% of oxygen, for enhanced combustion. The examples hereinafter show that membranes described herein exhibit exceptionally high gas permeabilities, at relatively low selectivity; such permeability characteristics are suitable for the end-use described herein.

In Examples I-IV hereinafter, gas permeation properties of the perfluorodioxole polymers were measured using samples of dense film membranes. The samples were cut into discs and mounted in a permeation cell, so as to form a feed gas chamber and a permeate gas chamber, the latter being operated at lower pressure.

In the air separation tests, the feed stream was compressed air, which was provided at a flow rate that was high enough to ensure a constant feed-stream composition; the permeate oxygen-enriched air was removed at atmospheric pressure. Permeate flow rate was measured by the volumetric displacement of a soap bubble in a calibrated burette, and permeate composition was determined by gas chromatography. In most of the single-gas permeation tests, the feed gas was provided at a pressure ranging from 21 kPa to 3500 kPa.

In some low pressure tests, the permeate gas flow rate was determined by measuring the rate of increase in pressure in a constant volume evacuated chamber. The permeability of the polymers for the gas was determined from the volume of the evacuated chamber and the thickness and surface area of the membrane.

The present invention is illustrated by the following examples.

EXAMPLE I

Membranes having a thickness of 0.25 mm were melt pressed from a dipolymer of perfluoro-2,2-dimethyl-1,3-dioxole and tetrafluoroethylene having a glass transition temperature of 253°C.

In single-gas and mixed gas permeation tests, using the permeation test method described above, the films exhibited exceptionally high permeability toward the components of air viz. 990 Barrers with respect to oxygen and 490 Barrers with respect to nitrogen; a Barrer is defined by the following formula:

$$Barrer = 10^{-10} [cm^3(STP).cm]/[cm^2.sec.cmHg]$$

Furthermore, it was found that the oxygen and nitrogen permeabilities were not functions of the feed pressures, nor of the membrane thickness.

EXAMPLE II

Membranes were prepared from a dipolymer of perfluoro-2,2-dimethyl-1,3-dioxole and tetrafluoro-ethylene having a glass transition temperature of 166°C. using melt pressing and solvent casting techniques. The melt pressed films had a thickness of 0.25 mm and the solvent cast films had a thickness of 0.025 mm.

The solvent cast films were formed from solution 15% by weight of the dipolymer in FC-75; FC-75 is the tradename of a commercial solvent available from 3M Company, and is perfluoro (2-butyl tetrahydrofuran)). Membranes having a thickness of 0.38 mm were cast from the solution onto a glass plate and the solvent was allowed to evaporate slowly; the dry membrane of the dipolymer that was obtained had a thickness of 0.025 mm.

The films were subjected to single-gas permeation tests using the procedure described above, using air and nitrogen. The results obtained are summarized in Table II.

Permeation results are summarized in Table II.

TABLE II

| Gas | Membrane Thickness | Feed Pressure | Permeability |
|---|---|---|---|
| $O_2$ | 0.250 mm | 3.55 MPa air | 350 Barrer |
| $O_2$ | 0.025 mm | 0.79 MPa air | 340 Barrer |
| $N_2$ | 0.250 mm | 3.55 MPa air | 130 Barrer |
| $N_2$ | 0.025 mm | 0.79 MPa air | 130 Barrer |

The results show that, for oxygen and nitrogen, membrane thickness had no apparent effect on the permeability results obtained.

The results also indicate that the dipolymer of this Example exhibits lower permeability than the dipolymer in Example I; the latter had a higher content of perfluoro-2,2-dimethyl-1,3-dioxole. However, permeability towards the components of air is still exceptionally high, being at least two orders of magnitude higher than polytetrafluoroethylene.

EXAMPLE III

Membranes with a thickness of 0.25 mm were melt-pressed from three dipolymers of perfluoro-2,2-dimethyl-1,3-dioxole and tetrafluoroethylene of different dioxole contents and glass transition temperatures (Tg). The average results of air separation tests using air with a feed stream pressure of 700–3500 kPa are given in Table III.

TABLE III

| Dioxole (mole %) | Tg | Permeability to $O_2$ | Selectivity $O_2/N_2$ |
|---|---|---|---|
| 66 | 166° C. | 340 Barrer | 2.6 |
| 76 | 203° C. | 380 Barrer | 2.3 |
| 86 | 253° C. | 990 Barrer | 2.05 |

In the air-separation tests, these dipolymer membranes exhibited exceptionally high $O_2$ and $N_2$ permeabilities. The membrane prepared from the lowest Tg-grade dipolymer had the highest $O_2/N_2$ selectivity, whereas the membrane prepared from the highest Tg-grade dipolymer had the highest $O_2$ permeability and lowest $O_2/N_2$ selectivity. In comparison, commercial air separation membranes formed from glassy polymers tend to be more selective but with substantially lower flux towards oxygen, with $O_2$ permeability typically ranging from about 1.3 Barrer (polysulfone) to 30 Barrer (poly 4-methylpentene); a very small proportion of known membranes or films exhibit permeabilities in excess of 100 Barrers for oxygen. The results of Table III also show that membranes of the invention may be prepared with a range of permeation properties.

EXAMPLE IV

Single-gas permeation tests were conducted using a membrane prepared from a membrane of the high-Tg dipolymer described in Example III. A number of different gases were tested. As a comparison, tests were also conducted on a membrane formed from polytetrafluoroethylene (PTFE).

A number of permeability measurements were conducted, using pressures that were generally in the range of 350–1750 kPa, it being the understanding that the permeability of the gases listed in Table IV is only a slight function of pressure in this pressure range.

The results obtained are given in Table IV.

TABLE IV

| Gas | Permeability | |
|---|---|---|
| | Dipolymer | PTFE |
| $O_2$ | 990 Barrer | 4.2 Barrer |
| $N_2$ | 490 Barrer | 1.4 Barrer |

The results obtained illustrate the high permeability obtainable with the membranes of the present invention. Whereas the selectivity demonstrated by the dipolymer and polytetrafluoroethylene membranes are similar, and believed to be relatively typical of glassy, non-rubbery polymers, the dipolymer membranes exhibit relatively very high permeability.

EXAMPLE V

Permeation measurements were conducted using a permeation cell that was immersed in water in a temperature-controlled water bath. The permeate from the permeation cell was passed through a sampler bulb of a gas chromatograph, to measure the composition of the permeate, and then to a soap film capillary to measure the permeate flow rate. Concentrations in gas mixtures were measured with a HP Gas Chromatograph model 5700A followed by a Spectra Physics Integrator type model SP4400. Pressure and pressure drop could be measured in the cell.

The membrane was placed on a porosive sinter (pore size 15–20 microns) and held in place using two Teflon® rings. The effective membrane area for mass transfer was 9.62 cm$^2$ (3.5 cm diameter).

When mixtures of gases were being tested, a purging stream with about 10 times the permeate flow rate was used to ensure a constant feed concentration, and the purged stream was monitored to determine the feed concentration. For measurements with single gases, the cell was purged at the beginning of each experiment for a short period of time.

Melt pressed membranes were prepared by placing polymer in a mould and heating to a temperature of about 20°C. above the glass transition temperature (Tg). When that temperature was reached, the polymer was treated by applying pressure and releasing it, using pressures of up to 50 tonnes/12.5 cm diameter of the membrane, for 5 minutes. The mould was then slowly cooled under a pressure of 40 tonnes/12.5 cm diameter, to room temperature. The resultant thick powder was transferred to the center of a flat plate covered by aluminum foil. Another aluminum foil-covered flat plate was mounted on it, without any spacer. The two plates were heated in a melt press, at minimal pressure, to a temperature of 100°C. above Tg, after which the pressure was raised to 40 tonne/12.5 cm diameter, and the sample was pressed for 10 minutes. The sample was then cooled slowly to room temperature under pressure, and the aluminum foil was peeled off carefully.

Cast membranes were prepared from solutions of the polymers in FC-75 solvent. The solution was warmed to 50–60 °C., and filtered through a 3 micron filter. The filtered solution was cast onto clean glass, and dried at ambient temperature in a dust free environment. The membrane was further dried in an oven at 80°C. for at least 2 hours, and then in an oven at 110°C. overnight.

Membranes were formed from a dipolymer of perfluoro-2,2-dimethyl-1,3-dioxole and tetrafluoroethylene having a glass transition temperature of 240°C., by solvent casting from a 2.5% solution in FC-75 solvent using the procedure described above, with the heating at 110°C. being for 12 hours. The resultant membrane was 20 micron thick.

The mixed gas fed to the permeation cell had the following composition: $N_2$ 78.25%, $O_2$ 20.67% with the remainder being a fluorocarbon gas.

Further experimental details and the results obtained are given in Table V. Measurements were made at 20°C. under steady-state conditions in this and the following examples, unless stated to the contrary.

TABLE V

| Pressure (kPa) | Permeability (Barrers) $O_2$ | $N_2$ | Selectivity $O_2/N_2$ |
|---|---|---|---|
| 700 | 242 | 114 | 2.1 |
| 445 | 263 | 112 | 2.4 |

The results show that the selectivity and high flux in the presence of another gas.

EXAMPLE VI

Membranes formed from poly-[perfluoro(2-methylene-4-methyl-1,3-dioxolane)] i.e. polymer of the aforementioned U.S. Pat. No. 3,308,107, had been tested for permeability using a volumetric method at 25°C.

Further experimental details and the results obtained are given in Table VI.

TABLE VI

| Gas | Permeability | Gas | Permeability |
|---|---|---|---|
| $O_2$* | 36 Barrers | $N_2$* | 10 Barrers |

*Results are averages of data for single gases and binary mixtures.

The results show that the polymer of U.S. Pat. No. 3,308,107 exhibit permeabilities to gases that were substantially lower than those measured as described above in examples herein, especially in comparison with data for membranes formed from the homopolymer.

EXAMPLE VII

A membrane of the homopolymer of perfluoro-2,2-dimethyl-1,3-dioxole was prepared using the solvent casting technique described in Example V; the membrane thickness was 33 microns. It was tested for permeability using synthetic air and single gases with a feed pressure of 790 kPa.

The results obtained are given in Table VII.

TABLE VII

| Gas | Permeability (24° C.) |
|---|---|
| He | 3600 Barrer |
| $H_2$ | 3300 Barrer |
| $O_2$ (air feed) | 1540 Barrer |
| $N_2$ (air feed) | 810 Barrer |
| $N_2$ | 830 Barrer |

It is believed that the permeabilities of hydrogen and helium are the highest measured with these gases, with the exception of polytrimethylsilylpropyne. The latter polymer, however, is known to have unstable gas transport properties e.g. see U.S. Pat. No. 4,859,215.

Moreover, the permeability of nitrogen in mixed gas tests was similar to the permeability of nitrogen in single gas tests, which indicates that there was no measurable interaction between copermeating oxygen and nitrogen molecules or competition for permeation paths in the polymer.

EXAMPLE VIII

The membrane of Example VII was tested in air separation over a broad range of feed pressures, to measure the effect of pressure on the permeability of permanent gases through the homopolymer of perfluoro-2,2-dimethyl-1,3-dioxole.

The results are given in Table VIII.

TABLE VIII

| Pressure of Feed Air | O₂ Flux (Barrer) | O₂/N₂ Selectivity |
|---|---|---|
| 270 | 1500 | 1.95 |
| 450 | 1560 | 2.0 |
| 620 | 1610 | 2.0 |
| 790 | 1620 | 2.0 |
| 960 | 1610 | 1.95 |
| 1140 | 1610 | 1.95 |
| 1480 | 1610 | 1.95 |
| 1830 | 1560 | 1.9 |
| 2170 | 1550 | 1.9 |

The results confirm that the partial pressure across the membrane has little affect on the permeability of oxygen and nitrogen through the membrane.

I claim:

1. A process for the operation of a mobile combustion engine having a combustion zone and an air intake system for the combustion zone comprising feeding air to a feed side of an oxygen enrichment membrane in the air intake system in a manner that causes an oxygen enriched portion of the air to permeate the membrane to a permeate side of the membrane and then feeding the oxygen enriched air from the permeate side to the combustion zone of the mobile combustion engine, the oxygen enrichment membrane comprising a film or coating of an amorphous polymer of perfluoro-2,2-dimethyl-1,3dioxole on a porous support said membrane exhibiting an oxygen/nitrogen selectivity of at least 1.4:1

2. The process of claim 1 in which the membrane has an oxygen flux in excess of 100 Barrers.

3. The process of claim 1 in which the membrane is in the form of a plurality of hollow fibres.

4. The process of claim 3 in which the permeate section is under vacuum.

5. The process of claim 4 in which the air intake system is connected to the interior of the fibres.

6. The process of claim 4 in which the air intake system is connected to the exterior of the fibres.

7. An air intake system for a mobile combustion engine, said air intake system comprising a membrane comprising a film or coating of an amorphous polymer of perfluoro-2,2-dimethyl-1,3-dioxole on a porous support, said membrane exhibiting an oxygen/nitrogen selectivity of at least 1.4:1.

8. The air intake system of claim 7 in which the membrane has an air feed section and a permeate section, said permeate section being adapted to be in fluid flow communication with a combustion zone of the mobile combustion engine.

9. The air intake system of claim 8 in which the membrane has an oxygen flux in excess of 100 Barrers.

10. The air intake system of claim 9 in which the selectivity of oxygen over nitrogen is at least 1.7:1.

11. The air intake system of claim 8 in which the membrane has an oxygen flux in excess of 500 Barrers.

12. The air intake system of claim 7 in which the membrane is in the form of a plurality of hollow fibres.

13. The air intake system of claim 12 in which the air intake system is connected to the interior of the fibres.

14. The air intake system of claim 12 in which the air intake system is connected to the exterior of the fibres.

15. A mobile combustion engine comprising a combustion zone and an air intake system for the combustion zone the air intake system comprising an oxygen enrichment membrane comprising a film or coating of an amorphous polymer of perfluoro-2,2-dimethyl-1,3-dioxole on a porous support, said membrane exhibiting an oxygen/nitrogen selectivity of at least 1.4:1, said membrane having an air feed section and a permeate section with the permeate section being in fluid flow communication with the combustion zone.

16. The mobile combustion engine of claim 15 in which the membrane has an oxygen flux in excess of 100 Barrers.

17. The mobile combustion engine of claim 16 in which the selectivity of oxygen over nitrogen is at least 1.7:1.

18. The mobile combustion engine of claim 15 in which the membrane has an oxygen flux in excess of 500 Barrers.

19. The mobile combustion engine of claim 15 in which the membrane is in the form of a plurality of hollow fibres.

20. The mobile combustion engine of claim 19 in which the air intake system is connected to the interior of the fibres.

21. The mobile combustion engine of claim 19 in which the air intake system is connected to the exterior of the fibres.

* * * * *